(12) United States Patent
Hwang et al.

(10) Patent No.: US 9,986,070 B2
(45) Date of Patent: May 29, 2018

(54) TRANSMITTING APPARATUS, RECEIVING APPARATUS, AND CONTROLLING METHODS, THEREOF

(71) Applicant: SAMSUNG ELECTRONICS CO., LTD., Gyeonggi-do (KR)

(72) Inventors: Sung-oh Hwang, Yongin-si (KR); Alain Mourad, Staines (GB); Hyun-koo Yang, Seoul (KR); Sung-hee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/247,053

(22) Filed: Aug. 25, 2016

(65) Prior Publication Data

US 2016/0366251 A1 Dec. 15, 2016

Related U.S. Application Data

(63) Continuation of application No. 14/452,133, filed on Aug. 5, 2014, now Pat. No. 9,462,090.
(Continued)

(30) Foreign Application Priority Data

May 23, 2014 (KR) .................. 10-2014-0062575

(51) Int. Cl.
*H04L 29/06* (2006.01)
*H04L 12/741* (2013.01)

(52) U.S. Cl.
CPC .............. *H04L 69/22* (2013.01); *H04L 45/74* (2013.01); *H04L 69/16* (2013.01)

(58) Field of Classification Search
CPC ..... H04L 69/22; H04L 47/2483; H04L 45/74; H04L 69/16; H04L 47/10; H04L 61/6063;
(Continued)

(56) References Cited

U.S. PATENT DOCUMENTS

| 8,102,853 B2 | 1/2012 | Ngo et al. |
| 8,743,874 B2 | 6/2014 | Kim et al. |

(Continued)

FOREIGN PATENT DOCUMENTS

| KR | 10-2008-0044321 A | 5/2008 |
| KR | 10-2010-0113978 A | 10/2010 |
| KR | 10-2011-0055339 A | 5/2011 |

OTHER PUBLICATIONS

Communication dated Jan. 24, 2017 issued by the European Patent Office in counterpart European Patent Application No. 14834212.4.
(Continued)

*Primary Examiner* — Obaidul Huq
(74) *Attorney, Agent, or Firm* — Sughrue Mion, PLLC

(57) ABSTRACT

A transmitting apparatus is provided. The transmitting apparatus includes: a baseband packet (BBP) generator configured to generate a BBP including a header and payload data; a frame generator configured to generate a frame including the BBP; a signal processor configured to signal-process the generated frame; and a transmitter configured to transmit the signal-processed frame. The header includes information about a type of the payload data, whether an additional header exists, a length of the payload data, and a Least Significant Bit (LSB) of the length of the payload data. Therefore, various types of data are mapped on a physical layer based on information included in the header, and data processing efficiency is improved.

5 Claims, 11 Drawing Sheets

Related U.S. Application Data

(60) Provisional application No. 61/873,493, filed on Sep. 4, 2013, provisional application No. 61/862,168, filed on Aug. 5, 2013.

(58) Field of Classification Search
CPC .. H04L 69/169; H04N 21/2381; H04W 80/04
USPC ........................................ 370/351, 389, 392
See application file for complete search history.

(56) References Cited

U.S. PATENT DOCUMENTS

| | | |
|---|---|---|
| 8,780,873 B2 | 7/2014 | Kim et al. |
| 8,787,369 B2 | 7/2014 | Kim et al. |
| 2005/0041635 A1 | 2/2005 | Chung et al. |
| 2008/0037540 A1 | 2/2008 | Ngo et al. |
| 2008/0037581 A1* | 2/2008 | Asano ................... H04J 3/1611 370/466 |
| 2009/0168770 A1 | 7/2009 | Mohanty |
| 2010/0098415 A1 | 4/2010 | Jiang |
| 2011/0268031 A1* | 11/2011 | Agiwal ................ H04W 28/065 370/328 |
| 2012/0014366 A1 | 1/2012 | Kim et al. |
| 2012/0042092 A1 | 2/2012 | Hong et al. |
| 2012/0082076 A1 | 4/2012 | Kim et al. |
| 2012/0163378 A1 | 6/2012 | Kim et al. |
| 2012/0236853 A1 | 9/2012 | Kim et al. |
| 2014/0044038 A1* | 2/2014 | Zhang ................... H04L 1/1854 370/328 |

OTHER PUBLICATIONS

Communication dated Jan. 31, 2017 issued by the Mexican Institute of Industrial Property in counterpart Mexican Patent Application No. MX/a/2016/001582.

Search Report dated Nov. 17, 2014 issued in International Application No. PCT/KR2014/007226 (PCT/ISA0210).

Written Opinion dated Nov. 17, 2014 issued in International Application No. PCT/KR2014/007226 (PCT/ISA/237).

* cited by examiner

TRANSMITTING APPARATUS, RECEIVING APPARATUS, AND CONTROLLING METHODS, THEREOF

CROSS-REFERENCE TO RELATED APPLICATION(S)

This is Continuation of U.S. application Ser. No. 14/452,133 filed Aug. 5, 2014 which claims priority under 35 U.S.C. § 119 from Korean Patent Application No. 10-2014-0062575, filed on May 23, 2014, in the Korean Intellectual Property Office, and from U.S. Provisional Application No. 61/862,168, filed on Aug. 5, 2013, and 61/873,493, field on Sep. 4, 2013, in the United States Patent and Trademark Office, the disclosures of which are incorporated herein by reference in their entirety.

BACKGROUND

1. Field

Apparatuses and methods consistent with exemplary embodiments of the inventive concept relate to a transmitting apparatus, a receiving apparatus, and controlling methods thereof, and more particularly, to providing a transmitting apparatus that has a function or a device for mapping data to transmit the data through a physical layer, a receiving apparatus, and controlling methods thereof.

2. Description of the Related Art

In the $21^{st}$ century information-oriented society, a broadcasting communication service is characterized by full-scale digitization, multi-channel, broadband, and high-quality. In particular, as distribution of high-definition digital televisions (TVs) and portable broadcasting apparatuses has extended, demands for supporting various receiving methods of a digital broadcasting service have increased.

Various types of technology standards have been globally adopted according to the demands. Various types of services have been provided to meet needs of users according to the technology standards.

In particular, the digital broadcasting service requires a method of efficiently transmitting data or signaling and simultaneously appropriately providing necessary information through a transmitting side that transmits multimedia data or signaling for the multimedia data. Various types of data may be processed according to how to constitute frame header information providing necessary information. Also, processing efficiency may be improved, and thus a method of constituting header information for maintaining the highest performance may be provided.

SUMMARY

Exemplary embodiments address at least the above problems and/or disadvantages and other disadvantages not described above. However, the exemplary embodiments are not required to overcome the disadvantages described above, and an exemplary embodiment may not overcome any of the problems described above.

The exemplary embodiments provide a transmitting apparatus, a receiving apparatus, and controlling methods thereof.

According to an aspect of the exemplary embodiments, there is provided a transmitting apparatus including: a baseband packet (BBP) generator configured to generate a BBP including a header and payload data; a frame generator configured to generate a frame including the BBP; a signal processor configured to signal-process the generated frame; and a transmitter configured to transmit the signal-processed frame. The header may include information about a type of the payload data, whether an additional header exists, a length of the payload data, and a Least Significant Bit (LSB) of the length of the payload data.

The information about whether the additional header exists may include information about whether at least one selected from a variable header and an extension header exists.

The variable header may include information about whether information indicating an address of a physical layer exists, whether some or all of upper layer data is transmitted, a position of some of the upper layer data, whether the extension header exists, and a size of information indicating a length of the extension header.

The variable header may further include at least one of information about a Most Significant Bit (MSB) of the length of the payload data, the address of the physical layer, an identification (ID) for identifying some of the upper layer data, a length of some of the upper layer data, and the length of the extension header.

In response to the payload data including a preset type of data, the extension header may include information for processing the preset type of data.

According to another aspect of the exemplary embodiments, there is provided a receiving apparatus including: a receiver configured to receive a frame including a header and payload data; an information extractor configured to extract header information from the received frame; and a signal processor configured to signal-process the payload data included in the frame based on the extracted header information. The header information may include information about a type of the payload data, whether an additional header exists, a length of the payload data, and an LSB of the length of the payload data.

The information about whether the additional header exists may include information indicating whether at least one selected from a variable header and an extension header exists.

The variable header may include information about whether information indicating an address of a physical layer exists, whether some or all of upper layer data is transmitted, a position of some of the upper layer data, whether the extension header exists, and a size of information indicating a length of the extension header.

The variable header may further include at least one of information about an MSB of the length of the payload data, the address of the physical layer, an ID for identifying some of the upper layer data, a length of some of the upper layer data, and the length of the extension header.

In response to the payload data including a preset type of data, the extension header may include information for processing the preset type of data.

According to an aspect of the exemplary embodiments, there is provided a method of controlling a transmitting apparatus. The method may include: generating a BBP including a header and payload data; generating a frame including the BBP; signal-processing the generated frame; and transmitting the signal-processed fame. The header may include information about a type of the payload data, whether an additional header exists, a length of the payload data, and an LSB of the length of the payload data.

The information about whether the additional header exists may include information indicating whether at least one selected from a variable header and an extension header exists.

The variable header may include information about whether information indicating an address of a physical layer exists, whether some or all of upper layer data is transmitted, a position of some of the upper layer data, whether the extension header exists, and a size of information indicating a length of the extension header.

The variable header may further include at least one of information about an MSB of the length of the payload data, the address of the physical layer, an ID for identifying some of the upper layer data, a length of some of the upper layer data, and the length of the extension header.

In response to the payload data including a preset type of data, the extension header may include information for processing the preset type of data.

According to another aspect of the exemplary embodiments, there is provided a method of controlling a receiving apparatus. The method may include: receiving a frame including a header and payload data; extracting header information from the received frame; and signal-processing the payload data included in the frame based on the extracted header information. The header information may include information about a type of the payload data, whether an additional header exists, a length of the payload data, and an LSB of the length of the payload data.

The information about whether the additional header exists may include information indicating whether at least one selected from a variable header and an extension header exists.

The variable header may include information about whether information indicating an address of a physical layer exists, whether some or all of upper layer data is transmitted, a position of some of the upper layer data, whether the extension header exists, and a size of information indicating a length of the extension header.

The variable header may further include at least one of information about an MSB of the length of the payload data, the address of the physical layer, an ID for identifying some of the upper layer data, a length of some of the upper layer data, and the length of the extension header.

In response to the payload data including a preset type of data, the extension header may include information for processing the preset type of data.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
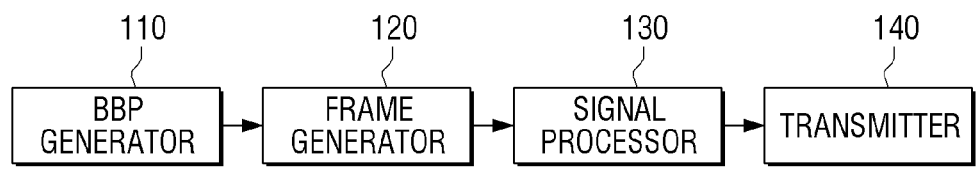
FIG. 1 is a block diagram illustrating a structure of a transmitting apparatus, according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of a transmitting apparatus 100 according to an exemplary embodiment.

Referring to FIG. 1, the transmitting apparatus 100 includes a baseband packet (BBP) generator 110, a frame generator 120, a signal processor 130, and a transmitter 140.

The BBP generator 110 may generate a BBP including a header and payload data. Here, the header may include information about the payload data and information about fields constituting the header. This will be described later.

The payload data may include one selected from an Internet protocol (IP) packet, a transport stream (TS) packet, signaling data, and combinations thereof. Also, data included in the payload data is not limited to the above-described example, and the payload data may include various types of data.

The BBP may be a unit packet necessary for mapping various types of input data on a physical layer. For example, the IP packet may be transmitted to one Physical Layer Pipes (PLP) through the BBP or may be transmitted along with the signaling data to the PLP.

The frame generator 120 may generate a frame including the BBP. In other words, the frame generator 120 may generate a baseband frame including the BBP. In detail, the frame generator 120 may arrange a plurality of BBPs including IP packets and headers to generate a baseband frame having a size corresponding to a forward error correcting (FEC) code. This may also be equally applied to IP packets and various types of data as described above. Processes of generating a BBP and a baseband frame will now be described in detail with reference to FIGS. 2 and 3.

Figure 2:
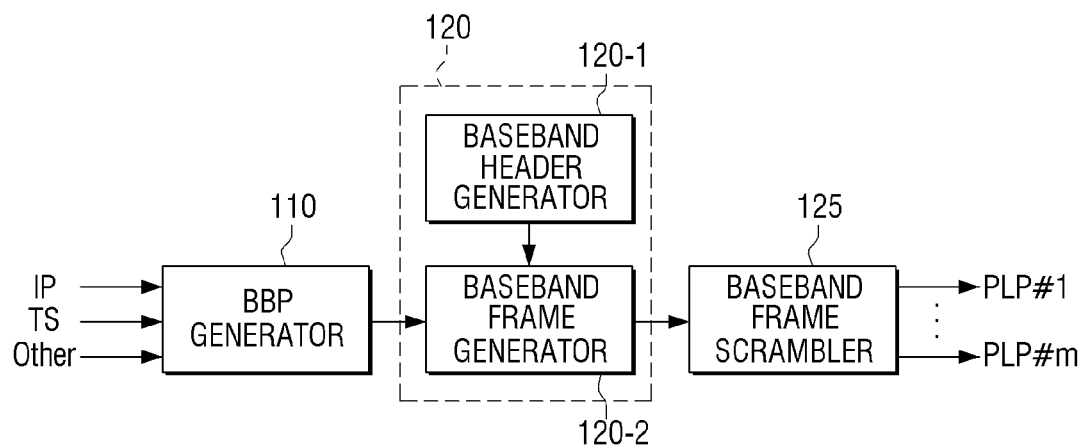
FIG. 2 is a block diagram illustrating a detailed structure of a frame generator, according to an exemplary embodiment.

FIG. 2 is a block diagram illustrating a detailed structure of the frame generator 120, according to an exemplary embodiment.

Referring to FIG. 2, the frame generator 120 may include a baseband header generator 120-1 and a baseband frame generator 120-2. The baseband frame generator 120 may also transmit a generated baseband frame to a baseband frame scrambler 125.

The BBP generator 110 may generate BBPs that are to be respectively transmitted to PLPs in relation to an input mode, from an IP packet, a TS packet, and various types of data that are input. For example, a BBP may correspond to an L2 packet in an International Organization for Standardization (ISO) 7 layer model. In other words, the BBP generator 110 may encapsulate a packet (an IP packet, a TS packet, or the like) input from a layer higher than input Layer 2 to generate a BBP.

The baseband header generator 120-1 may generate a header that is inserted into the baseband frame. Here, the header that is inserted into the baseband frame is referred to as a baseband header that includes information about the baseband frame.

The baseband frame generator 120-2 may add the baseband header generated by the baseband header generator 120-1 to one or more BBPs output from the BBP generator 110 to generate the baseband frame.

The baseband frame scrambler 125 randomly scrambles data stored in baseband frames before FEC codes are respectively added to the baseband frames to generate a scrambled baseband frame. The scrambled baseband frame is transmitted through a PLP to be signal-processed.

Here, the PLP refers to a signal path that is independently processed. In other words, respective services (e.g., video, expanding video, audio, a data stream, etc.) may be transmitted and received through a plurality of radio frequency (RF) channels, and the PLP may be a path through which the services are transmitted or a stream that is transmitted through the path. The PLP may be positioned in slots that are distributed at time intervals on a plurality of RF channels or may be distributed at time intervals on one RF channel. In other words, one PLP may be distributed and transmitted at time intervals on a plurality of RF channels.

A structure of the PLP includes input mode A that provides one PLP and input mode B that provides a plurality of PLPs. In particular, if the input mode B is supported, a robust particular service may be provided, and one stream may be distributed and transmitted to increase a time interleaving length in order to obtain a time diversity gain. Also, if only a particular stream is received, a receiver may be turned off for other time intervals to save power so as to be appropriate for providing portable and mobile broadcasting services.

Here, the time diversity refers to a technology by which if a transmitting side transmits the same signal several times at regular time intervals to reduce deterioration of a transmission quality on a mobile communication transmission path, a receiving side receives and synthesizes the signals to obtain a high transmission quality.

Information that may be commonly transmitted to a plurality of PLPs may be included in one PLP, and then transmitted to increase transmission efficiency. Here, PLP0 operates as this and is referred to as a common PLP, and other PLPs except the PLP0 may be used to transmit data and referred to as data PLPs.

If a PLP as described above is used, a high-definition television (HDTV) program may be received at a home. Also, a standard definition television (SDTV) program may be provided even when a receiver is carried and moved. In addition, various types of broadcasting services may be provided to a viewer through a broadcasting station or a broadcasting content provider, and a differentiated service may be provided to receive a broadcasting service even in a fringe area where reception is poor.

Figure 3:
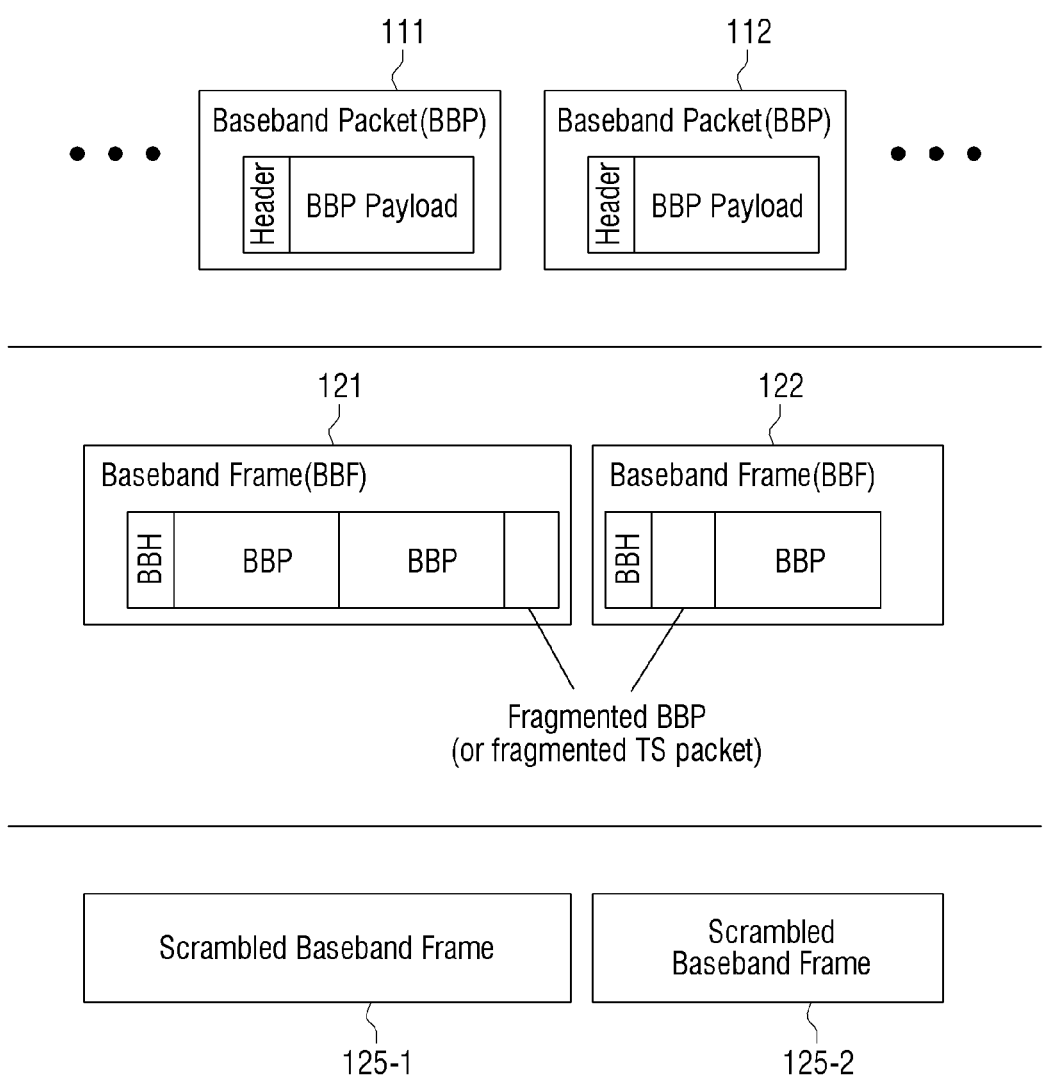
FIG. 3 is a view illustrating baseband packets (BBPs), baseband frames, and scrambled baseband frames, according to an exemplary embodiment.

FIG. 3 is a view illustrating BBPs, baseband frames, and scrambled baseband frames, according to an exemplary embodiment.

Referring to FIG. 3, the BBP generator 110 may store various types of data such as IP packets, TS packets, etc. in BBP payloads and add headers into the BBP payloads to generate a plurality of BBPs 111 and 112. The baseband frame generator 120 may group the plurality of BBPs 111 and 112 and add baseband headers into the grouped BBPs to generate a plurality of baseband frames 121 and 122. Here, each of the baseband frames 121 and 122 may include a plurality of BBPs or may include some of BBPs or a fragmented BBP.

As shown in FIG. 3, if some of BBPs are inserted into the baseband frame 121, the other BBPs are inserted into the baseband frame 122.

A header inserted into a BBP is different from a baseband header inserted into a baseband frame.

The baseband frame scrambler 125 may randomly scramble the baseband frames 121 and 122 to generate a plurality of scrambled baseband frames 125-1 and 125-2. Also, as described above, the scrambled baseband frames 125-1 and 125-2 may be transmitted to a PLP and may be signal-processed so as to add FEC codes to the scrambled baseband frames 125-1 and 125-2.

Referring to FIG. 1 again, the signal processor 130 may signal-process a generated frame. Here, the generated frame may refer to a baseband frame as described above.

In detail, although not shown in the drawings, the signal processor 130 may include a Bit Interleaved Code Modulation (BICM) encoder (not shown) and a frame builder (not shown). Respective signal-processing processes will now be described in brief. The BICM encoder determines an FEC coding rate and a constellation order to perform coding according to an area (e.g., a fixed PHY frame or a mobile PHY frame) to which data to be serviced will be transmitted. Signaling information about the data to be serviced may be encoded through the additional BICM encoder (not shown) or the BICM encoder which encodes the data.

The frame builder, to constitute a frame, determines an orthogonal frequency division multiplexing (OFDM) parameter for a signaling area and an OFDM parameter for the area to which the data to be serviced will be transmitted, and adds a sync area to generate a frame. The transmitter 140 may transmit a signal-processed frame to a transmitting apparatus (not shown). Here, the signal-processed frame may refer to a baseband frame that is signal-processed by the signal processor 130.

In detail, the transmitter 140 may include an OFDM waveform generator (not shown). The OFDM waveform generator modules the generated frame into an RF signal and transmits the RF signal to a receiving apparatus (not shown).

A header inserted into a BBP according to an exemplary embodiment may include information about a type of payload data, whether an additional header exits, a length of the payload data, and a Least Significant Bit (LSB) of the length of the payload data. This will now be described in detail with reference to FIG. 4.

Figure 4:
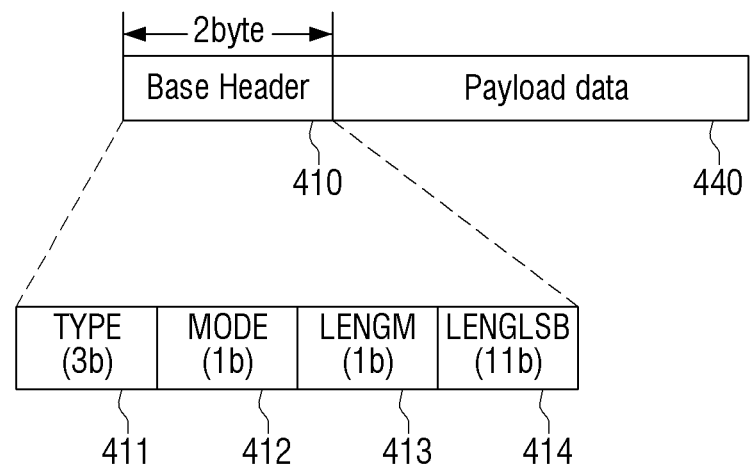
FIG. 4 is a view illustrating a structure of a BBP, according to an exemplary embodiment.

FIG. 4 is a view illustrating a structure of a BBP 400, according to an exemplary embodiment.

Referring to FIG. 4, the BBP 400 may include a header 410 and payload data 440. The header 410 is illustrated as a base header in FIG. 4 to be distinguished from an additional header. Therefore, the header 410 and the base header may be defined as the same header, and the base header will be used instead of the header 410 to be distinguished from the additional header.

The base header 410 is positioned at a start point of the BBP 400 and has a fixed size of two (2) bytes. In other words, the base header 410 is inserted into the BBP 400 at all times.

The base header 410 includes a TYPE field 411, a MODE field 412, a LENGM field 413, and a LENGLSB field 414.

Here, the TYPE field 411 indicates information about a type of the payload data 440, may be formed of three (3) bits, and may have values as shown in Table 1 below.

TABLE 1

| Value | Description |
| --- | --- |
| 000 | Padding |
| 001 | Signaling |
| 010 | IPv4 data |
| 011 | IPv6 data |
| 100 | TS data (supporting mixtures of a TS stream with other streams of other input types in the same PLP) |
| 101 to 111 | Reserved |

If the TYPE field 411 is set to 000, the TYPE field 411 indicates that the payload data 440 includes a padding area that refers to data that are inserted to prevent interference.

If the TYPE field 411 is set to 001, the TYPE field 411 indicates that the payload data 440 includes signaling data that includes information necessary for detecting data from the payload data 440.

If the TYPE field 411 is set to 010, the TYPE field 411 indicates that the payload data 440 includes IP version 4 (IPv4) of data. The IPv4 refers to a fourth version of an IP, and the IP refers to a protocol that is used to transmit data from one computer to another computer on the Internet. In other words, each computer on the Internet has respectively at least one or more addresses to be distinguished from others, and these addresses are IPs.

If the TYPE field 411 is set to 011, the TYPE field 411 indicates that the payload data 440 includes IPv6 of data. IPv6 refers to a protocol that is suggested to resolve a lack of IP addresses of IPv4.

If the TYPE field 411 is set to 100, the TYPE field 411 may indicate that the payload data 440 includes TS data or may indicate that the payload data 440 includes another type of data stream and a TS stream together.

If the TYPE field 411 is set to 101 or 111, the TYPE field 411 may indicate that the payload data 440 is empty for a later use.

The MODE field 412 may indicate information about whether an additional header exists after the base header 410 and may be formed of one (1) bit. The MODE field 412 may also server for a header having an appropriate length according to a type and an attribute of transmitted data.

Here, the information about whether the additional header exists after the base header 410 includes information about whether at least one of a variable header and an extension header exists. The variable header and the extension header will be described later.

In detail, if the MODE field 412 is set to 0, the MODE field 412 indicates that the variable header and the extension header do not exist, and the BBP 400 includes only the base header 410. Therefore, as shown in FIG. 4, the payload data 440 is connected after the base header 410. In other words, FIG. 4 is a view illustrating the BBP 400 including the base header 410 and the payload data 440 where the MODE field 412 is set to 0.

If the MODE field 412 is set to 1, the MODE field 412 indicates that the variable header having a minimum size of one (1) byte exists after the base header 410.

The LENGM field 413 may indicate information about a length of the payload data 440 and may be formed of one (1) bit.

The LENGM field 413 supports the payload data 440 that may have various lengths. In detail, if the LENGM field 413 is set to 0, the LENGM field 413 indicates that the payload data 440 having a shorter length than 2048 bytes is included in the BBP 400. If the LENGM field 413 is set to 1, the LENGM field 413 indicates that the payload data 440 having a length greater than or equal to 2048 bytes is included in the BBP 400. Here, the payload data 440 may have a maximum length of $2^{19}-1$ bytes.

The LENGLSB field 414 may indicate information about an LSB of a length of the payload data 440 and may be formed of 11 bits. In other words, the LENGLSB field 414 indicates the LSB of the length of the payload data 440 in 11 bits.

In detail, if the LENGM field 413 is set to 0, the LENGLSB field 414 indicates an actual length of the payload data 440. If the LENGM field 413 is set to 1, the LENGLSB field 414 is connected to an LENGMSB field included in the variable header that will be described later, to indicate an actual length of the payload data 440. In other words, if the LENGM field 413 is set to 0, the 11 bits of the LENGLSB field 414 indicates the actual length of the payload data 440.

An IP packet, a TS packet, and various types of data that are input may be stored in the payload data 440.

If the MODE field 412 is set to 1, the variable header having the minimum size of one (1) byte may be added after the base header 410. A structure of the variable header will now be described with reference to FIG. 5.

Figure 5:
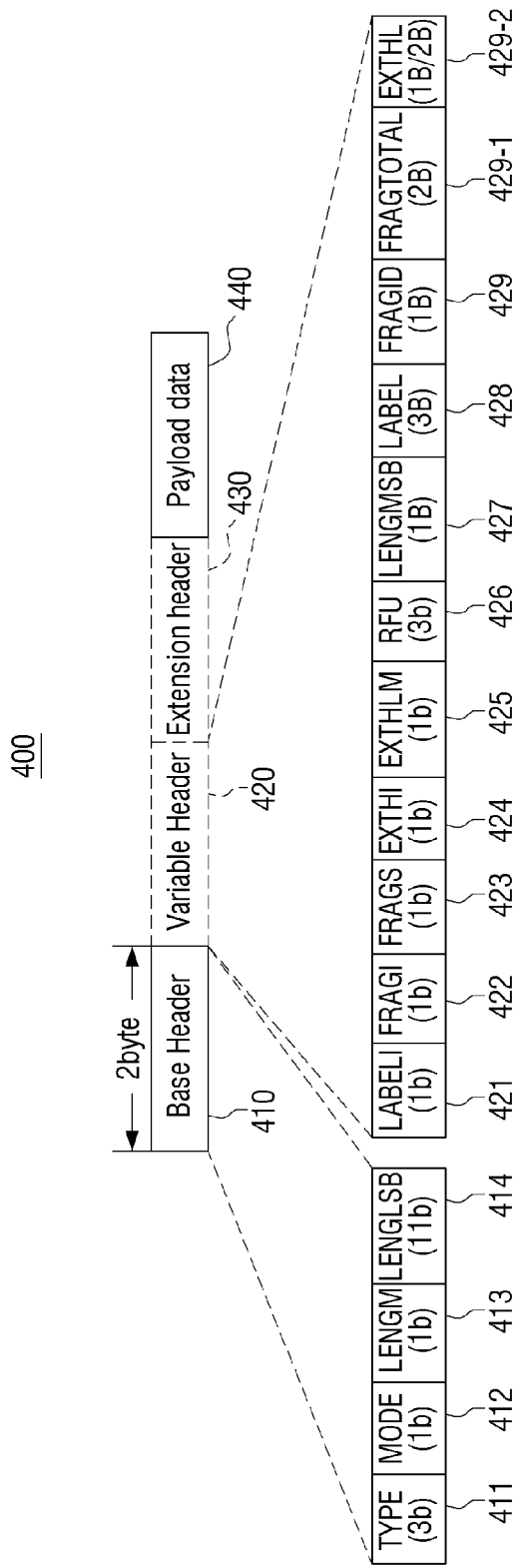
FIG. 5 is a view illustrating a structure of a BBP including a base header and an additional header, according to an exemplary embodiment.

FIG. 5 is a view illustrating a structure of a BBP 400 including a base header 410 and an additional header, according to an exemplary embodiment.

Here, the additional header may include at least one of a variable header 420 and an extension header 430.

Referring to FIG. 5, the BBP 400 includes the base header 410, the variable header 420, the extension header 430, and the payload data 440. Here, the base header 410 and the payload data 440 have been described above, and thus their detailed descriptions are omitted.

As described above, if the MODE field 412 is set to 1, the variable header 420 having a minimum size of one (1) byte may be added after the base header 410. Here, the variable header 420 having the size of one (1) byte may include information about whether information indicating an address of a physical layer exists, whether some or all of upper layer data is transmitted, whether the extension header 430 exists, and a size of information indicating a length of the extension header 430.

The variable header 420 may further include at least one of information about a Most Significant Bit (MSB) of a length of the payload data 440, the address of the physical layer, an identifier (ID) for identifying some of the upper layer data, a length of some of the upper layer data, and a length of the extension header 430.

In detail, if the information about the length of the payload data 440 has a preset value, the variable header 420 may further include information about the MSB of the length of the payload data 440. If the information about whether the information indicating the address of the physical layer exits has a preset value, the variable header 420 may further include information about the address of the physical layer. If the information about whether some or all of the upper layer data is transmitted has a preset value, the variable header 420 may further include information about the ID for identifying some of the upper layer data. Also, if information about a position of some of the upper layer data has a preset value, the variable header 420 may further include information about a length of some of the upper layer data. If the information about the whether the extension header 430 exists has a preset value, the variable header 420 may further include information about the length of the extension header 430.

Referring to FIG. 5, the variable header 420 may include an LABELI field 421, an FRAGI field 422, an FRAGS field 423, an EXTHI field 424, an EXTHLM field 425, and an RFU field 426 that respectively indicate information about whether the information indicating the address of the physical layer exists, whether some or all of the upper layer data is transmitted, whether the extension header 430 exists, and the size of the information indicating the length of the extension header 430.

If the LENGM field 413 included in the base header 410 is set to 1, the variable header 420 may further include an LENGMSB field 427. If the LABELI field 421 is set to 1, the variable header 420 may further include an LABEL field 428. If the FRAGI field 422 is set to 1, the variable header 420 may further include an FRAGID field 429. If the FRAGS field 423 is set to 1, the variable header 420 may further include an FAGTOTAL field 429-1. If the EXTHI field 424 is set to 1, the variable header 420 may further include an EXTHL field 429-2.

FIG. 5 illustrates all fields 421, 422, 423, 424, 425, 426, 427, 428, 429, 429-1, and 429-2 of the variable header 420. This is to describe all fields that may be included in the variable header 420, and the variable header 420 may include only the LABELI field 421, the FRAGI field 422, the FRAGS field 423, the EXTHI field 424, the EXTHLM field 425, and the RFU field 426. As described above, the variable header 420 may further include at least one of the LENGMSB field 427, the LABEL field 428, the FRAGID field 429, the FRAGTOTAL field 429-1, and the EXTHL field 429-2, according to values set in the LENGM field 413, the LABELI field 421, the FRAGI field 422, the FRAGS field 423, and the EXTHI field 424.

Here, the LABELI field 421 may indicate whether information indicating the address of the physical layer exists and may be formed of one (1) bit. In other words, the LABELI field 421 indicates whether there exists the LABEL field 428 having a size of three (3) bytes including the information about the address of the physical layer.

In detail, if the LABELI field 421 is set to 0, the LABELI field 421 indicates that the LABEL field 428 does not exist. If the LABELI field 421 is set to 1, the LABELI field 421 indicates that the LABEL field 428 exits.

The FRAGI field 422 may indicate whether some or all of the upper layer data is transmitted and may be formed of one (1) bit. In other words, the FRAGI field 422 indicates whether the payload data 440 includes a fragment of a Protocol Data Unit (PDU) of an upper layer. Here, the PDU refers to a protocol data unit, i.e., a data unit that is designated in a protocol of a particular layer.

In detail, if the FRAGI field 422 is set to 1, the FRAGI field 422 indicates that the payload data 440 includes the fragment of the PDU of the upper layer. If the FRAGI field 422 is set to 0, the FRAGI field 422 indicates that the payload data 440 includes the PDU of the upper layer. In other words, if the FRAGI field 422 is set to 1, the FRAGI field 422 indicates that the payload data 440 includes some of the upper layer data. If the FRAGI field 422 is set to 0, the FRAGI field 422 indicates that the payload data 440 includes all of the upper layer data.

The FRAGS field 423 may indicate a position of some of the upper layer data and may be formed of one (1) bit. In other words, the FRAGS field 423 indicates whether the payload data 440 includes a first fragment of the PDU of the upper layer.

In detail, if the FRAGS field 423 is set to 1, the FRAGS field 423 indicates that the payload data 440 includes the first fragment of the PDU of the upper layer. If the FRAGS field 423 is set to 0, the FRAGS field 423 indicates that the payload data 440 includes another fragment, not the first fragment, of the PDU of the upper layer.

If the FRAGI field 422 is set to 0, the payload data 440 includes the PDU of the upper layer. Therefore, it is obvious that the payload data 440 includes the first fragment of the PDU of the upper layer, and thus the FRAGS field 423 may be set to 1.

The FRAGI field 422 and the FRAGS field 423 may be bound together to be expressed with two (2) bits. For example, if the FRAGI field 422 and the FRAGS field 423 are set to 00, the FRAGI field 422 and the FRAGS field 423 indicate that the payload data 440 does not include any fragment of the PDU of the upper layer. If the FRAGI field 422 and the FRAGS field 423 are set to 01, the FRAGI field 422 and the FRAGS field 423 that the payload data 440 includes a fragment of the PDU of the upper layer, and the included fragment is the first fragment of the PDU of the upper layer. Also, if the FRAGI field 422 and the FRAGS field 423 are set to 10, the FRAGI field 422 and the FRAGS field 423 indicate that the payload data 440 includes a fragment of the PDU of the upper layer, and the included fragment is a middle fragment of the PDU of the upper layer. If the FRAGI field 422 and the FRAGS field 423 are set to 11, the FRAGI field 422 and the FRAGS field 423 indicate that the payload data 440 includes a fragment of the PDU of the upper layer, and the included fragment may indicate a last fragment of the PDU of the upper layer or an area that is empty to be used later.

The EXTHI field 423 may indicate whether the extension header 430 exists and may be formed of one (1) bit. In other words, the EXTHI field 424 indicates whether the extension header 430 exists after the variable header 420.

In detail, if the EXTHI field 424 is set to 0, the BBP 400 does not include the extension header 430. If the EXTHI field 424 is set to 1, the BBP 400 includes the extension header 430, and the extension header 430 is positioned after the variable header 420.

FIG. 5 illustrates the BBP 440 including all of the base header 410, the variable header 420, and the extension header 430, but this is only an exemplary embodiment. If the EXTHI field 424 is set to 0, the BBP 400 includes only the base header 410 and the variable header 420.

The EXTHLM field 425 indicates a size of information indicating a length of the extension header 430 and may be formed of one (1) bit.

In detail, if the EXTHLM field 425 is set to 0, the EXTHLM field 425 indicates that the size of the information indicating the length of the extension header 430 is small, and thus a length of the EXTHL field 429-2 indicating the length of the extension header 430 is one (1) byte.

If the EXTHLM field 425 is set to 1, the EXTHLM field 425 indicates that the size of the information indicating the length of the extension header 430 is large, and thus the length of the EXTHL field 429-2 indicating the length of the extension header 430 that will be described later is two (2) bytes.

The RFU field 426 refers to an area that will be reserved to be used if necessary and may be formed of 3 bits.

If the LENGM field 413 of the base header 410 is set to 1, the length of the payload data 440 may be longer than or equal to 2048 as described above, and the LENGMSB field 427 indicating information about an MSB of the length of the payload data 440 may be included from a second byte of the variable header 420.

The LENGMSB field 427 may indicate the MSB of the length of the payload data 440 and may be formed of one (1) byte. In other words, the LENGMSB field 427 indicates an MSB of eight (8) bits of the payload data 440.

In detail, only if the LENGM field 413 of the base header 410 is set to 1, i.e., the length of the payload data 440 is longer than or equal to 2048, the LENGMSB field 427 exists. Here, the LENGMSB field 427 is connected to the LENGLSB field 414 of the base header 410 to indicate an actual length of the payload data 440.

If the LABELI field 421 included in a first byte of the variable header 420 is set to 1, the variable header 420 may include the LABEL field 428 indicating information about a physical layer of the variable header 420.

The LABEL field 428 may indicate the address of the physical layer and may be formed of three (3) bytes. In detail, the LABEL field 428 indicates the address of the physical layer that is used to filter hardware.

If the FRAGI field 422 included in the first byte of the variable header 420 is set to 1, the variable header 420 may include the FRAGID field 429 indicating information about an ID for identifying some of the upper layer data.

The FRAGID field 429 may indicate an ID of a fragment of the PDU of the upper layer included in the payload data 440 and may be formed of one (1) byte. The FRAGID field 429 may indicate IDs of 256 or more fragments.

If the FRAGS field 423 included in the first byte of the variable header 420 is set to 1, the variable header 420 may include the FRAGTOTAL field 429-1 indicating information about a length of some of the upper layer data.

The FRAGTOTAL field 429-1 may indicate lengths of all fragments of the PDU of the upper layer included in the payload data 440 and may be formed of two (2) bytes. The FRAGTOTAL field 429-1 may be used by a receiving apparatus (not shown) to check lengths of different fragments included in different BBPs.

If the EXTHI field 424 included in the first byte of the variable header 420 is set to 1, the variable header 420 may include the EXTHL field 429-2 having a length of one (1) byte or two (2) bytes according to a value set in the EXTHLM field 425.

The EXTHL field 429-2 may indicate a length of the extension header 430 and may be formed of one (1) byte or two (2) bytes.

In detail, if the EXTHLM field 425 is set to 0, the length of the EXTHL field 429-2 is one (1) byte. If the EXTHLM field 425 is set to 1, the length of the EXTHL field 429-2 is two (2) bytes.

To sum the above-described contents up, the length of the variable header 420 may be between 0 byte and 10 bytes.

In detail, if the MODE field 412 indicating whether an additional header of the base header 410 exists is set to 0, the BBP 400 does not include the variable header 420 and the extension header 430, and thus the length of the variable header 420 is 0 byte.

If the MODE field 412 of the base header 410 is set to 1, the BBP 400 includes the variable header 420 having a minimum size of one (1) byte.

If all of the LENGM field 413 of the base header 410, and the LABELI field 421, the FRAGI field 422, the FRAGS field 423, and the EXTHI field 424 included in the first byte of the variable header 420 are set to 1, the variable header 420 may include all of the LENGMSB field 427, the LABEL field 428, the FRAGID field 429, the FRAGTOTAL field 429-1, and the EXTHL field 429-2. If the variable header 420 includes all of the above-described fields, the length of the variable header 420 may be 10 bytes to the maximum.

If the EXTHI field 424 of the variable header 420 is set to 1, the extension header 430 may exist after the variable header 420, and the EXTHL field 429-2 indicating the length of the extension header 430 may be two (2) bytes to the maximum. Therefore, the length of the extension header 430 may be $(2^{16}-1)$ bytes to the maximum.

If the payload data 440 includes a preset type of data, the extension header 430 may include information for processing the preset type of data. In other words, if the payload data 440 includes a particular type of data, a particular layer of data, or the like, the extension header 430 may additionally include information for processing the particular type of data, the particular layer of data, or the like.

The extension header 430 may be an area that will be used later and may include various types of information and fields that are not included in the base header 410 and the variable header 420.

The BBP 400 according to the exemplary embodiment may correspond to an L2 packet. Here, the L2 packet refers to a packet that is used on Layer 2 of ISO 7 layer and has an MAC address of a destination and an MAC address of a source.

Figure 6:
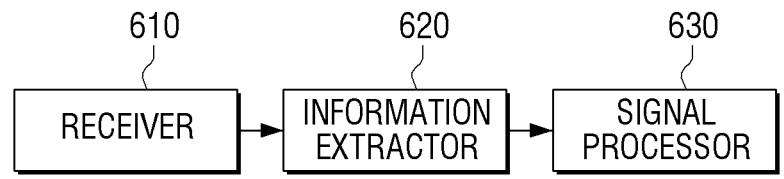
FIG. 6 is a block diagram illustrating a structure of a receiving apparatus, according to an exemplary embodiment.

FIG. 6 is a block diagram illustrating a structure of a receiving apparatus 600, according to an exemplary embodiment.

Referring to FIG. 6, the receiving apparatus 600 includes a receiver 610, an information extractor 620, and a signal processor 630.

The receiver 610 may receive a frame including a header and payload data.

The information extractor 620 may extract header information from the received frame.

The signal processor 630 may signal-process the payload data included in the frame based on the extracted header information. Here, the header information may include information about a type of the payload data, whether an additional header exists, a length of the payload data, and an LSB of the length of the payload data.

Here, the information about whether the additional header exists may include information about whether at least one of a variable header and an extension header exists.

The variable header may include information about whether information indicating an address of a physical layer exists, whether some or all of upper layer data is transmitted, a position of the upper layer data, whether the extension header exists, and a size of information indicating a length of the extension header.

The variable header may further include at least one of information about an MSB of the length of the payload data, the address of the physical layer, an ID for identifying some of the upper layer data, a length of some of the upper layer data, and a length of the extension header.

If the payload data include a preset type of data, the extension header may include information for processing the preset type of data.

Figure 7:
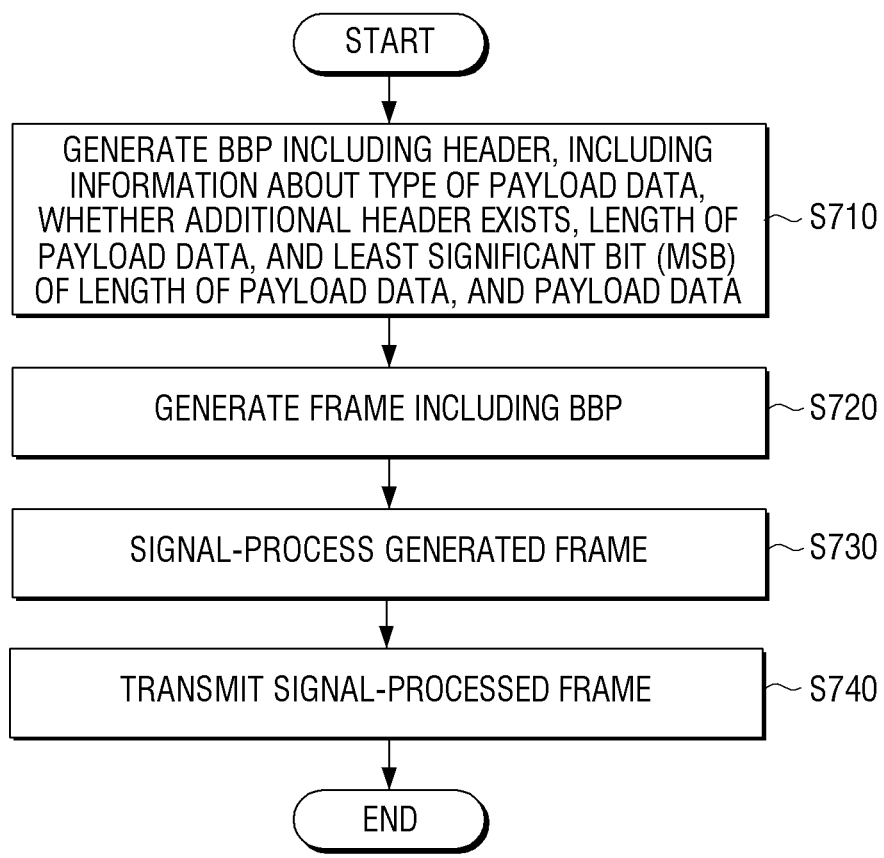
FIG. 7 is a flowchart illustrating a method of controlling a transmitting apparatus, according to an exemplary embodiment.

FIG. 7 is a flowchart illustrating a method of controlling a transmitting apparatus, according to an exemplary embodiment.

Referring to FIG. 7, in operation S710, the transmitting apparatus generates a BBP including a header and payload data. Here, the header includes information about a type of the payload data, whether an additional header exists, a length of the payload data, and an LSB of the length of the payload data.

Here, the information about whether the additional header exists may include information indicating whether at least one of a variable header and an extension header exists.

Also, the variable header may include information about whether information indicating an address of a physical layer exists, whether some or all of upper layer data is transmitted, a position of some of the upper layer data, whether the extension header exists, and a size of information indicating a length of the extension header.

The variable header may further include at least one of information about an MSB of the length of the payload data, an ID for identifying some of the upper layer data, a length of some of the upper layer data, and the length of the extension header.

Also, if the payload data includes a preset type of data, the extension header may include information for processing the preset type of data.

In operation S720, the transmitting apparatus generates a frame including the BBP.

In operation S730, the transmitting apparatus signal-processes the generated frame. In operation S740, the transmitting apparatus transmits the signal-processed frame.

Figure 8:
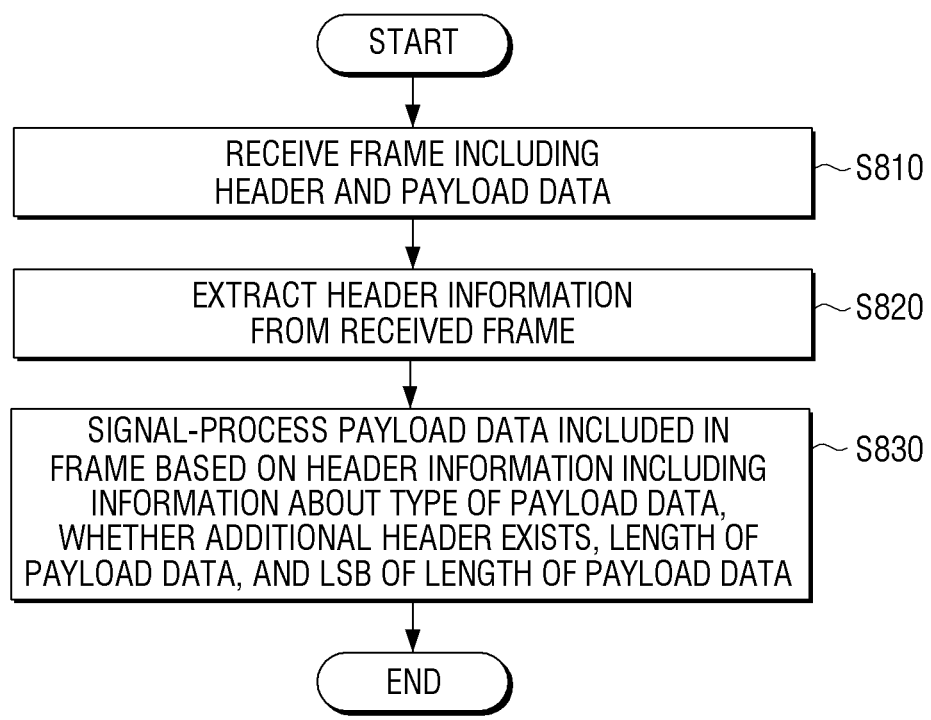
FIG. 8 is a flowchart illustrating a method of controlling a receiving apparatus, according to an exemplary embodiment.

FIG. 8 is a flowchart illustrating a method of controlling a receiving apparatus, according to an exemplary embodiment.

Referring to FIG. 8, in operation S810, the receiving apparatus receives a frame including a header and payload data.

In operation S820, the receiving apparatus extracts header information from the received frame.

In operation S830, the receiving apparatus signal-processes the payload data included in the frame based on the header information including information about a type of the payload data, whether an additional header exists, a length of the payload data, and an LSB of the length of the payload data.

Here, the information about whether the additional header exists may include information about whether at least one of a variable header and an extension header exists.

Also, the variable header may include information about whether information indicating an address of a physical layer exists, whether some or all of upper layer data is transmitted, a position of some of the upper layer data, whether the extension header exits, and a size of information indicating a length of the extension header.

The variable header may further include at least one of information about an MSB of the length of the payload data, the address of the physical layer, an ID for identifying some of the upper layer data, the length of some of the upper layer data, and the length of the extension header.

If the payload data includes a preset type of data, the extension header may include information for processing the preset type of data.

According to various exemplary embodiment as described above, various types of data may be mapped on a physical layer based on information included in a header, and data processing efficiency may be improved.

Figure 9:
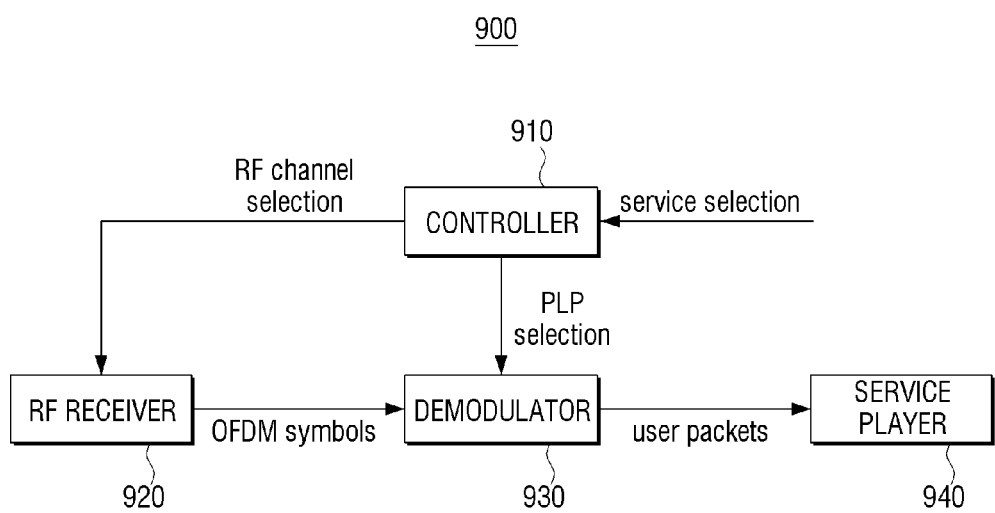
FIG. 9 is a block diagram illustrating a structure of a receiver, according to an exemplary embodiment.

FIG. 9 is a block diagram illustrating a structure of a receiver 900, according to an exemplary embodiment.

Referring to FIG. 9, the receiver includes a controller 910, an RF receiver 920, a demodulator 930, and a service player 940.

The controller 910 determines an RF channel and a PLP to which a selected service is transmitted. Here, the RF channel may be defined as a center frequency and a bandwidth, and the PLP may be defined as a PLP ID. In order to transmit a particular service, each of fragments constituting the particular service may be transmitted through one or more PLPs belonging to one or more RF channels. However, for convenience, all data necessary for playing one service will be described as being transmitted to one PLP that is transmitted to one RF channel. In other words, a service has one data acquiring path that is defined as an RF channel and a PLP.

The RF receiver 920 detects an RF signal from a selected RF channel, signal-processes the RF signal to extract OFDM symbols, and transmits the OFDM symbols to the demodulator 930. Here, the signal processing may include synchronization, channel estimation, equalization, etc., and information for the signal-processing may be a value that is preset by a transmitter and/or a receiver or may be included in a preset particular one of the OFDM symbols to be transmitted to the receiver according to a use purpose and a realization thereof.

The demodulator 930 signal-processes the OFDM symbols to extract user packets and transmits the user packets to the service player 940. The service player 940 plays and outputs a service selected by a user by using the user packets. Here, formats of the user packets may vary according to a realization method of the service, for example, may be TS packets or IPv4 packets.

Figure 10:
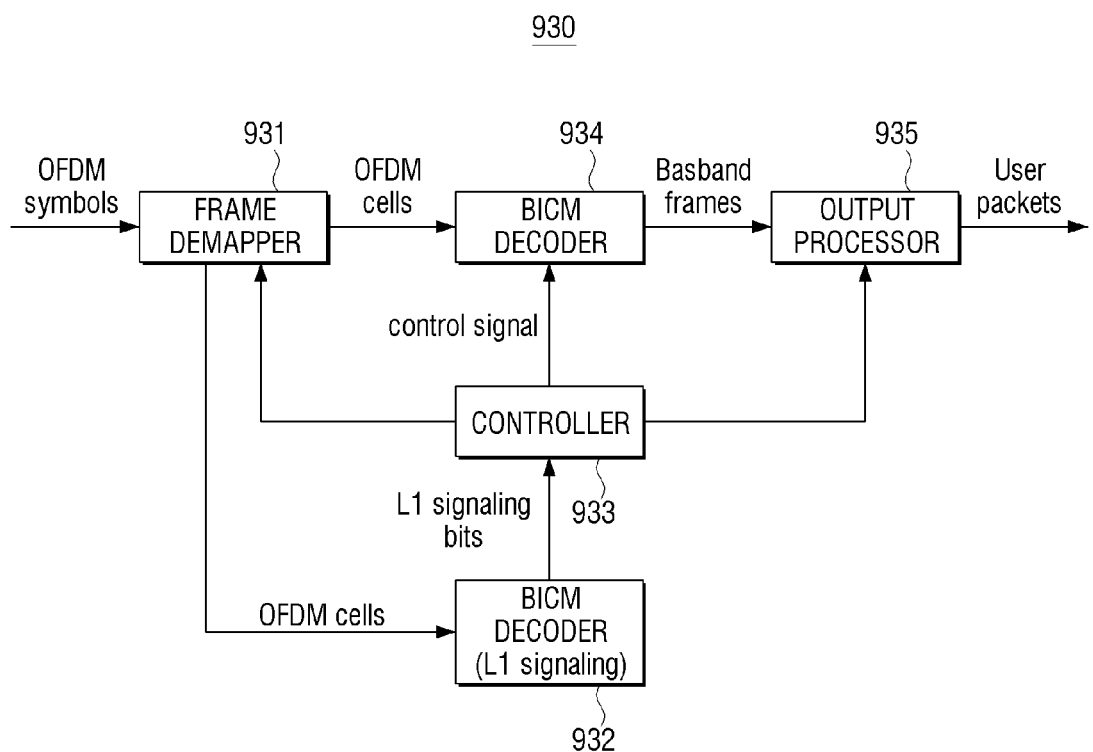
FIG. 10 is a block diagram illustrating a detailed structure of a demodulator of FIG. 9, according to an exemplary embodiment.

FIG. 10 is a block diagram illustrating a detailed structure of the demodulator 930 of FIG. 9, according to an exemplary embodiment.

Referring to FIG. 9, the demodulator 930 includes a frame demapper 931, a BICM decoder 932 for L1 signaling, a controller 933, a BICM decoder 934, and an output processor 935.

The frame demapper 931 selects OFDM cells constituting FEC blocks that are selected from a frame including OFDM symbols and belong to a PLP and transmits the selected OFDM cells to the BICM decoder 934 based on control information transmitted from the controller 933. The frame demapper 931 also selects OFDM cells corresponding to one or more FEC blocks including the L1 signaling and transmits the selected OFDM cells to the BICM decoder 932 for the L1 signaling.

The BICM decoder 932 signal-processes an OFDM cell corresponding to an FEC block including the L1 signaling to extract L1 signaling bits and transmits the L1 signaling bits to the controller 933. In this case, the signal-processing may include a process of extracting a log-likelihood ratio (LLR) value for decoding a low-density parity-check (LDPC) code and a process of decoding the LDPC code by using the extracted LLR value.

The controller 933 extracts an L1 signaling table from the L1 signaling bits and controls operations of the frame demapper 931, the BICM decoder 934, and the output processor 935 by using a value of the L1 signaling table. For convenience of description, in FIG. 10, the BICM decoder 932 for the L1 signaling does not use the control information of the controller 933. However, if the L1 signaling has a similar layer structure to a structure of L1-PRE or L1-POST, the BICM decoder 932 for the L1 signaling may include one or more BICM decoding blocks, and operations of the BICM decoding blocks and the frame demapper 931 may be controlled by L1 signaling information of an upper layer.

The BICM decoder 934 signal-processes the OFDM cells constituting the FEC blocks belonging to a selected PLP to extract baseband frames and transmits the baseband frames to the output processor 935. Here, the signal-processing may include a process of extracting an LLR value for decoding an LDPC code from the OFDM cells and a process of decoding the LDPC code by using the extracted LLR value and may be performed based on the control information transmitted from the controller 933.

The signal processor 935 signal-processes the baseband frames to extract user packets and transmits the extracted user packets to a service player. In this case, the signal-processing may be performed based on the control information transmitted from the controller 933.

According to an exemplary embodiment, the L1 signaling includes information about types of user packets that are transmitted through a corresponding PLP and an operation that is used for encapsulating the user packets in baseband frames. Here, the corresponding information is included in the control information that is transmitted from the controller 933 to the output processor 935. The output processor 935 extracts user packets from the received baseband frames based on the control information.

According to an exemplary embodiment, the L1 signaling may particularly include ISSY mode information, information about a buffer size of a receiver required according to the ISSY mode information, and information about an output time of a first user packet of a corresponding PLP included in a frame. Here, this information in included in the control information that is transmitted from the controller 933 to the output processor 935. The output processor 935 stores the user packets in a buffer and transmits the user packets to the service player at a fixed time based on the control information.

Figure 11:
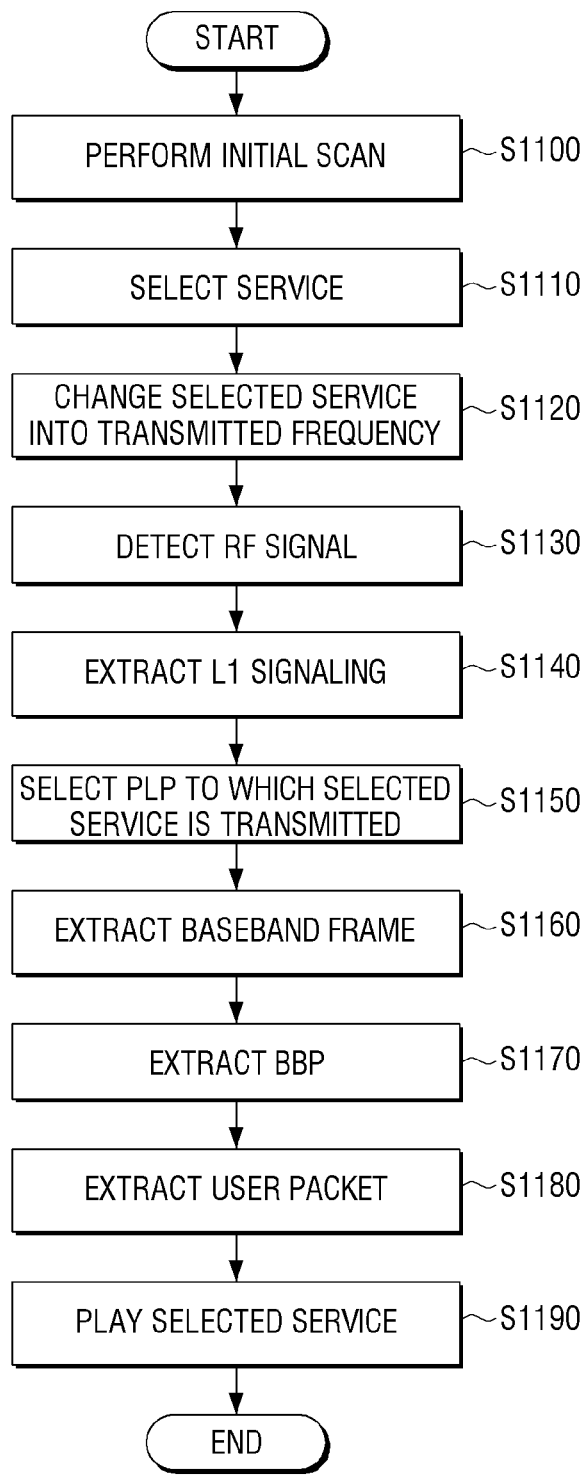
FIG. 11 is a flowchart illustrating a brief operation of a receiver until an actually selected service is played from when a user selects a service, according to an exemplary embodiment.

FIG. 11 is a flowchart illustrating an operation of a receiver until an actually selected service is played from when a user selects a service, according to an exemplary embodiment.

Service information about all selectable services may be acquired in operation S1100 before operation S1110 where a user selects a service. Here, the service information may include information about an RF channel and a PLP to which pieces of data necessary for playing a particular service in a current broadcasting system are transmitted. An example of the service information may include Program-Specific Information/Service Information (PSI/SI) of MPEG2-TS that may be generally acquired through L2 signaling and upper layer signaling.

In operation S1100 according to the present exemplary embodiment, comprehensive information about payload types of PLPs transmitted in a particular frequency band may be acquired. An example of the comprehensive information may include information indicating whether all PLPs transmitted in a frequency band include a particular type of data.

If the user selects the service in operation S1110, the receiver changes the selected service into a transmitted frequency in operation S1120 and detects an RF signal in operation S1130. The service information may be used in operation S1120.

If the RF signal is detected in operation S1130, the receiver extracts L1 signaling from the detected RF signal in operation S1140. In operation S1150, the receiver selects a PLP to which the selected service is to be transmitted, by using the L1 signaling extracted in operation S1140. In operation S1160, the receiver extracts a baseband frame from the selected PLP. The service information may be used in operation S1150.

Operation S1160 may include: a process of demapping a transmission frame to select OFDM cells belonging to a PLP; a process of extracting an LLR value for coding and/or decoding an LDPC code from the OFDM cells; and a process of decoding the LDPC code by using the extracted LLR value.

In operation S1170, the receiver extracts a BBP from the extracted baseband frame by using header information of the extracted baseband frame. In operation S1180, the receiver extracts a user packet from the extracted BBP by using header information of the extracted baseband packet. The extracted user packet is used to play the selected service in operation S1190. The L1 signaling information acquired in operation S1140 may be used in operations S1170 and S1180.

According to an exemplary embodiment, L1 signaling may include information about a type of a user packet that is transmitted through a corresponding PLP and an operation that is used to encapsulate the user packet in a baseband frame. Here, this information may be used in operation S1180. In more detail, the user packet may be extracted through reversal operations of operations used in an encapsulation process.

According to an exemplary embodiment, the L1 signaling may include ISSY mode information, information about a buffer size of a receiver required according to the ISSY mode information, and information about an output time of a first user packet of a corresponding PLP. Here, this information may be used for controlling a buffer in operation S1180. In more detail, this information may be used to control a size of a buffer in which the extracted user packet will be stored and a time at which the user packet is output to a service player.

According to various exemplary embodiments as described above, various types of data may be mapped on a physical layer based on information included in a header, and data processing efficiency may be improved.

There may be provided a non-transitory computer-readable medium that stores a program sequentially performing controlling methods according to the above exemplary embodiments.

For example, there may be provided a non-transitory computer-readable medium that stores a program performing: generating a BBP including a header and payload data; generating a frame including the BBP; signal-processing the generated frame; and transmitting the signal-processed frame.

Also, there may be provided a non-transitory computer-readable medium that stores a program performing: receiving a frame including a header and payload data; extracting header information from the received frame; and signal-processing the payload data included in the frame based on the extracted header information.

The non-transitory computer-readable medium refers to a medium which does not store data for a short time such as a register, a cache memory, a memory, or the like but semi-permanently stores data and is readable by a device. In detail, the above-described various applications or programs may be stored and provided on a non-transitory computer readable medium such as a compact disc (CD), a digital versatile disc (DVD), a hard disk, a blue-ray disk, a universal serial bus (USB), a memory card, a read-only memory (ROM), or the like.

Components, elements or units represented by a block as illustrated in FIGS. 1, 2, 6, 9 and 10 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like A bus is not illustrated in the above-described blocks of a transmitting apparatus and a receiving apparatus. However, communications between elements of the transmitting apparatus and elements of the receiving apparatus may be performed through the bus. Also, each device may further include a processor such as a central processing unit (CPU), a microprocessor, or the like that performs the above-described various operations.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A transmitting apparatus comprising:
a packet generator configured to generate a packet comprising a header and a payload; and
a transmitter configured to transmit the packet,
wherein the header comprises a base header which comprises a first field and a second field;
wherein the first field comprises a value indicating a packet type of input data and,
wherein the second field comprises a first value indicating that there is an additional header or a second value indicating that there is no the additional header,
wherein, if the second field comprises the first value, the base header comprises a third field indicating least significant bits (LSBs) of a length of the payload, and the additional header comprises a fourth field and a fifth field;
wherein the fourth field indicates most significant bits (MSBs) of the length of the payload, and
wherein the fifth field comprises a value indicating whether an extension header is present.

2. The transmitting apparatus of claim 1, wherein the additional header comprises information about whether information indicating an address of a physical layer exists, and whether upper layer data is transmitted.

3. The transmitting apparatus of claim 2, wherein the additional header further comprises at least one of information about the address of the physical layer and an identification (ID) for identifying the upper layer data.

4. The transmitting apparatus of claim 3, wherein if the payload comprises a predetermined type of data, the additional header comprises information for processing the predetermined type of data.

5. The transmitting apparatus of claim 1, wherein the length of the additional header is one (1)byte.

* * * * *